United States Patent [19]

Stehn

[11] Patent Number: 4,919,369

[45] Date of Patent: Apr. 24, 1990

[54] LOUDSPEAKER MOUNTING MECHANISM

[75] Inventor: Werner Stehn, Hemmingen, Fed. Rep. of Germany

[73] Assignee: Electronic-Werke Deutschland GmbH, Villingen-Schwenningen, Fed. Rep. of Germany

[21] Appl. No.: 363,839

[22] Filed: Jun. 2, 1989

[51] Int. Cl.⁵ .............................................. H04R 1/02
[52] U.S. Cl. .................................... 248/27.3; 181/172
[58] Field of Search ................. 248/544, 27.1, 27.3, 248/220.2, 221.3, 221.4, 222.1, 231.2; 181/141, 150, 171, 172; 24/616; 381/188; 403/289, 329

[56] References Cited

U.S. PATENT DOCUMENTS

| 3,369,784 | 2/1968 | Whitney | 248/27.1 |
| 3,859,480 | 1/1975 | Birkner | 381/188 |
| 4,123,621 | 10/1978 | Walker | 181/150 |
| 4,165,146 | 8/1979 | Snyder | 248/27.3 |
| 4,179,009 | 12/1979 | Birkner | 181/141 |
| 4,359,133 | 11/1982 | Krolak | 181/172 |
| 4,546,850 | 10/1985 | Litner | 248/27.3 |
| 4,550,796 | 11/1985 | Tomita | 181/150 |

FOREIGN PATENT DOCUMENTS

| 2842738 | 4/1980 | Fed. Rep. of Germany | 381/188 |
| 84598 | 5/1983 | Japan | 381/188 |
| 2056816 | 3/1981 | United Kingdom | 381/188 |

OTHER PUBLICATIONS

Moore, William H., "Loud Speaker Retainer", RCA Technical Notes No. 576, Dec. 1964.

Primary Examiner—Ramon O. Ramirez
Assistant Examiner—Robert A. Olson
Attorney, Agent, or Firm—Joseph S. Tripoli; Peter M. Emanuel; Frederick A. Wein

[57] ABSTRACT

A mechanism for mounting a loudspeaker in a front panel includes a plurality of arms having lips affixed to the front panel. A plurality of fingers are affixed to the loudspeaker. The arms and fingers resiliently engage to enable the loudspeaker to be mounted on the panel using a linear motion.

11 Claims, 1 Drawing Sheet

LOUDSPEAKER MOUNTING MECHANISM

BACKGROUND

This invention relates to a mechanism for mounting a loudspeaker on a panel.

In the prior art a loudspeaker is typically mounted on the front panel of a television receiver, a radio receiver or the dashboard of an automobile using screws, or other screw-in fastening devices. These mounting techniques are disadvantageous because they are inconvenient and difficult to use with automatic assembly equipment. For these reasons there is a need for a mounting mechanism which is simple in construction, which can be used with both manual and automatic manufacturing techniques, which allows detachment and which does not require screws or other means of screw fastening. The present invention is directed to a speaker mounting mechanism which fulfills these needs.

The invention is useful with all sizes of speakers but is especially suitable for small treble loudspeakers, such as piezoelectric treble loudspeakers. Additionally, with the invention the loudspeaker can be attached to the front frame of a television or radio receiver using a linear motion without the need for any twisting or rocking movements as well as without the need for screws or other such attaching devices. The invention is also advantageous because the loudspeaker is easily detachable from the front panel without the need for the tedious removal of mounting screws.

SUMMARY OF THE INVENTION

A mechanism for mounting a loudspeaker into a front panel includes a plurality of arms arranged on opposite sides of an opening for receiving the loudspeaker, the ends of the arms being angled inwardly toward the panel to form lips. A plurality of fingers are disposed on the loudspeaker and extend away from the front of the speaker and outwardly away from the axis of the loudspeaker. The fingers and the lips resiliently engage each other as the speaker is inserted onto the front panel from the rear of the panel and the ends of the fingers lock to the lips to attach the loudspeaker to the front panel.

DETAILED DESCRIPTION

Figure 1:
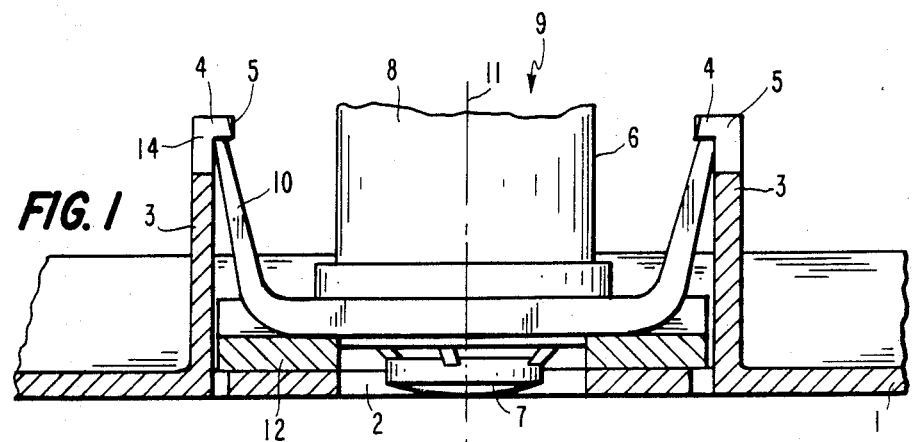
FIG. 1 is a side view in cross section of a preferred embodiment with the loudspeaker mounted to the front panel shown.

In FIG. 1, a front panel 1 includes an opening 2 and two arms 3 extending substantially perpendicular to the front panel 1. The ends 5 of the arms 3 are angularly disposed with respect to the arms 3 and extend towards each other to form a lip 4. A loudspeaker 6 including a diaphragm 7 and a magnet 8, is inserted into the opening 2 of the front panel 1, using a rectilinear motion, along the direction of arrow 9. The rectilinear motion is a translational, or linear, movement and the assembly does not need twisting or rotational motion.

The loudspeaker 6 includes resilient fingers 10 which normally are angularly disposed with respect to the axis of the speaker. During the insertion of the speaker 6 into the front panel 1 the fingers 10 slide along the ends 5 of the arms 3, and are biased radially inwardly toward the axis 11 of the opening 2. After the fingers pass the ends 5 they spring outwardly and lock behind the lips 4 of the arms 3. A resilient seal 12 is arranged between the front of the loudspeaker 6 and the front panel 1. The seal 12 serves to compensate for tolerance variations of the speaker 6 and the front panel 1. The seal 12 thus assures a tight, motion free holding of the loudspeaker 6 in the front panel 1 to prevent vibration of the speaker 6.

Figure 2:
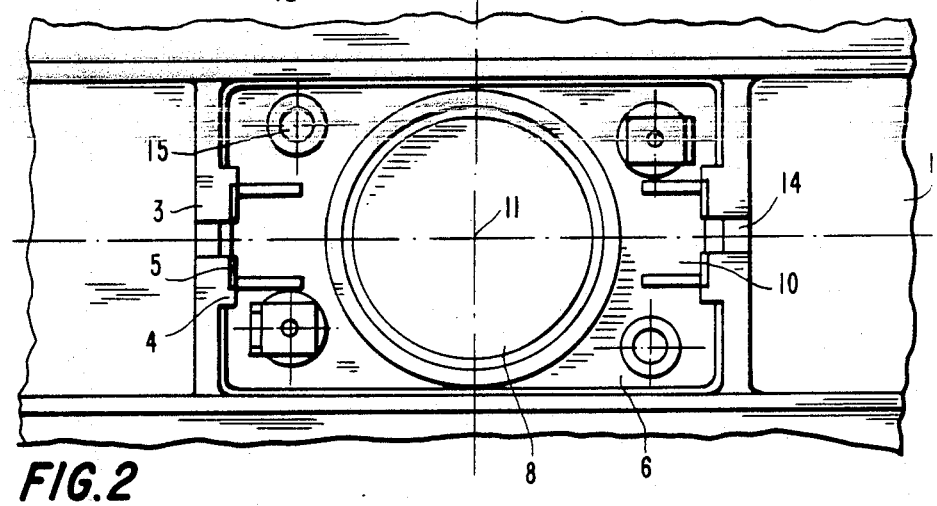
FIG. 2 is a top view of the embodiment of FIG. 1.

In FIG. 2, openings 14 are provided in the centers of the arms 3. The openings 14 are located to reveal the ends of the fingers 10. Accordingly, the ends of the fingers 10 can be biased inwardly by the insertion of a tool through the openings 14 to disengage the fingers 10 from the lips 4. The tool can be a scissors type device having blades which enter the openings 14 and engage the fingers 10 to bias them inwardly and to permit the extraction of the speaker 6 from the front panel 1. The loudspeaker 6 can be removed from the front panel 1 using a linear motion in a direction opposite to direction of the arrow 9. For the embodiment described, the arms 3 are rigid and the fingers 10 are flexible. These features can be reversed while retaining the advantages of the invention.

Figure 3:
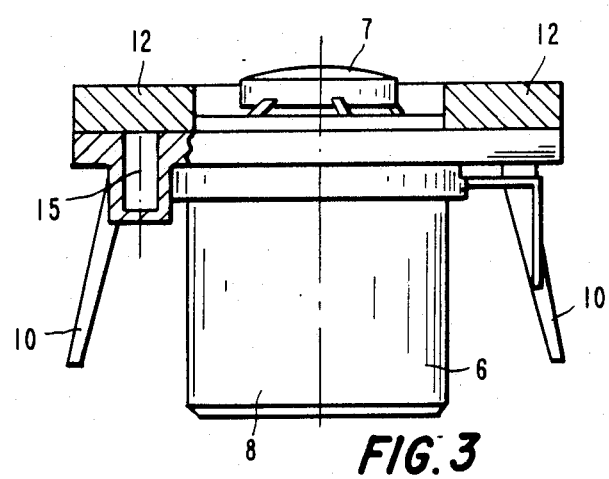
FIG. 3 is a side view of the loudspeaker and seal assembly.

In FIG. 3, the front flange of the loudspeaker 6 includes several bores 15 which are widened towards the end. These bores are used to receive an insertion tool for either the manual or automated insertion of the speaker 6 in the front panel 1. The bores 15 also ensure the accurate centering of the loudspeaker 6 in relation to the front panel 1.

What is claimed is:

1. An arrangement including a loudspeaker and a panel comprising in combination:
    an opening in said panel for receiving said loudspeaker;
    a plurality of arms arranged on opposite sides of said opening, the ends of said arms being angled inwardly toward said opening to form lips, and
    a plurality of fingers on said loudspeaker, said fingers extending outwardly away from an axis of said loudspeaker, said fingers and said lips being resiliently engageable as said loudspeaker is inserted onto said panel and the ends of said fingers lock to said lips to attach said loudspeaker to said panel.

2. The mechanism of claim 1 further including apertures in said arms in the proximity of said fingers for providing access to said fingers for detaching said loudspeaker from said frame.

3. The mechanism of claim 2 wherein said arms are rigid and said fingers are resilient.

4. The mechanism of claim 2 wherein said arms are resilient and said fingers are rigid.

5. The mechanism of claim 2 further including a resilient seal between said loudspeaker and said front frame.

6. The mechanism of claim 5 wherein said arms are resilient and said fingers are rigid.

7. The mechanism of claim 5 wherein said arms are rigid and said fingers are resilient.

8. The mechanism of claim 5 further including guide bores in said speaker for centering said loudspeaker in said front panel.

9. The mechanism of claim 2 further including guide bores in said speaker for centering said loudspeaker in said front panel.

10. The mechanism of claim 9 wherein said arms are rigid and said fingers are resilient.

11. The mechanism of claim 9 wherein said arms are resilient and said fingers are rigid.

* * * * *